United States Patent
Yamaguchi

(10) Patent No.: US 7,256,414 B2
(45) Date of Patent: Aug. 14, 2007

(54) METHOD OF AND APPARATUS FOR READING OUT RADIATION IMAGE

(75) Inventor: Akira Yamaguchi, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 28 days.

(21) Appl. No.: 11/081,509

(22) Filed: Mar. 17, 2005

(65) Prior Publication Data

US 2005/0205814 A1   Sep. 22, 2005

(30) Foreign Application Priority Data

Mar. 17, 2004  (JP) ............... 2004-076110

(51) Int. Cl.
*G01N 23/04* (2006.01)
(52) U.S. Cl. ............................ 250/591
(58) Field of Classification Search ............... 250/584
See application file for complete search history.

(56) References Cited

U.S. PATENT DOCUMENTS

| | | | |
|---|---|---|---|
| 4,687,937 A * | 8/1987 | Aagano et al. | 250/588 |
| 4,864,132 A * | 9/1989 | Adachi et al. | 250/584 |
| 5,864,146 A * | 1/1999 | Karellas | 250/581 |
| 2002/0179868 A1* | 12/2002 | Shoji | 250/580 |

FOREIGN PATENT DOCUMENTS

JP   2002-224095 A   8/2002

* cited by examiner

*Primary Examiner*—David Porta
*Assistant Examiner*—Marcus Taningco
(74) *Attorney, Agent, or Firm*—Sughrue Mion, PLLC

(57) ABSTRACT

A radiation image read out from a radiation image sensor, which stores electric charges corresponding to the amount of radiation exposed onto the radiation image sensor upon exposure of radiation carrying thereon a radiation image and stores the radiation image, by causing the radiation image sensor to output an electric signal corresponding to the stored electric charges and by amplifying the output electric signal by a reading amplifier. A part of the stored electric charges are read before reading the radiation image and, the gain of the reading amplifier is changed on the basis of the amount of electric charges of the part of the stored electric charges which has been read before reading the radiation image.

12 Claims, 4 Drawing Sheets

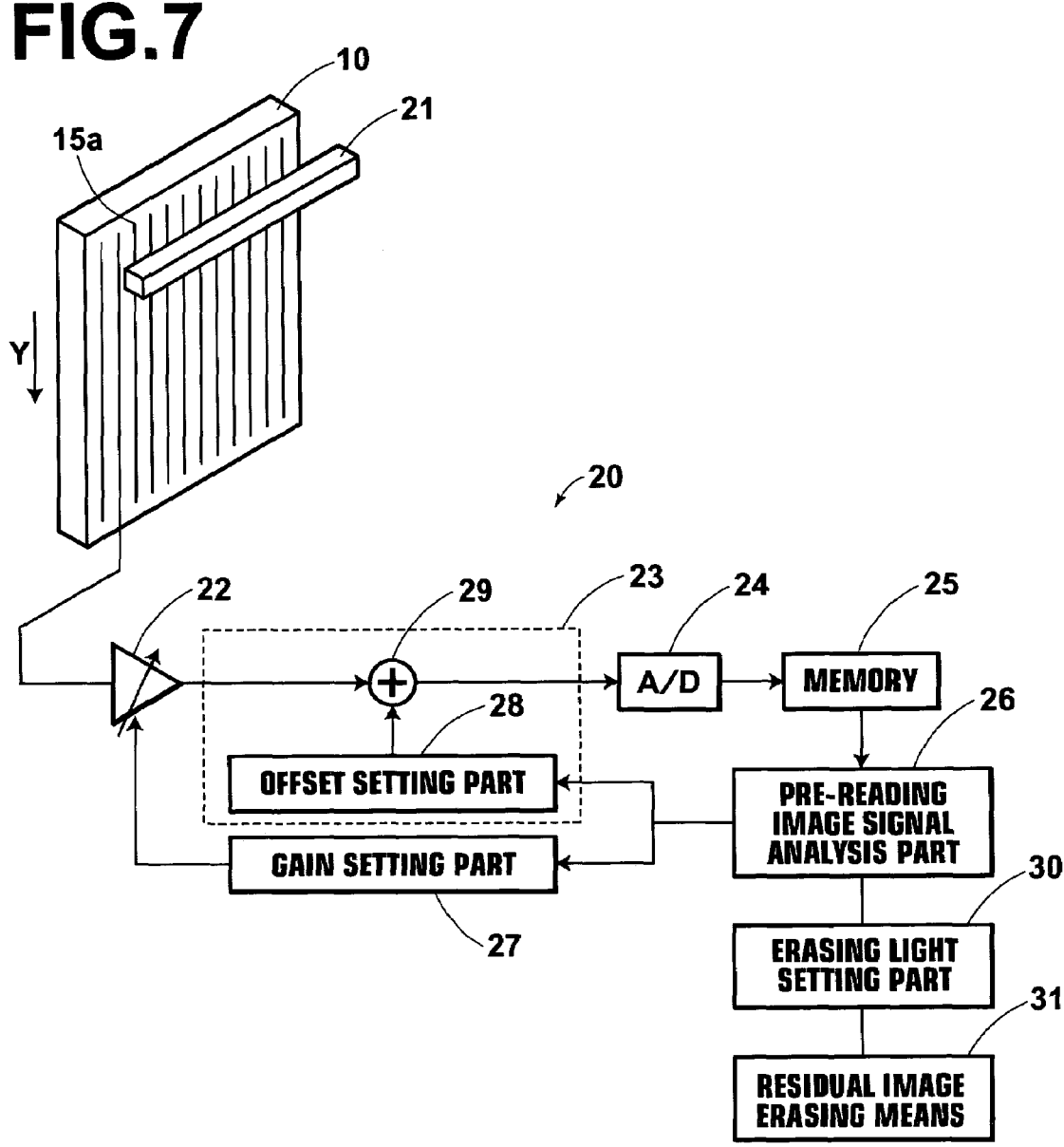

METHOD OF AND APPARATUS FOR READING OUT RADIATION IMAGE

BACKGROUND OF THE INVENTION

1. Field of the Invention

This invention relates to a method of and apparatus for reading a radiation image from a radiation image sensor which stores a radiation image upon exposure to radiation bearing thereon the radiation image.

2. Description of the Related Art

Conventionally, for instance, in the medical field, various radiation image sensors on which a radiation image of an object is recorded upon exposure to radiation passing through the object and which outputs electric signals representing the recorded radiation image have been proposed and put into practice.

As the radiation image sensor, there has been known those employing semiconductor material which generates electric charges upon exposure to radiation. As such radiation image sensors, there have been proposed those of so-called an optical-reading system and a TFT system.

As the radiation image sensor of the optical-reading system, a radiation image sensor comprising a first electrode layer permeable to radiation, a recording photoconductive layer which generates electric charges upon exposure to radiation, a charge transfer layer which behaves like a substantially insulating material to the electric charge in the same polarity as a latent image and behaves like a substantially conductive material to the electric charge in the polarity opposite to that of the latent image, a reading photoconductive layer which generates electric charges upon exposure to reading light, and a second electrode layer in which a plurality of linear electrodes permeable to the reading light are arranged in parallel to each other, the layers being superposed one on another in this order, has been proposed.

In the radiation image sensor, radiation carrying thereon a radiation image is exposed from the first electrode layer side and electric charges generated in the recording photoconductive layer are stored on the interface between the recording photoconductive layer and the charge transfer layer, thereby recording a radiation image. When a linear reading light beam scans the radiation image sensor in the longitudinal direction of the linear electrodes, electric charges are generated in the reading photoconductive layer and a part of the electric charges of one polarity is combined with the stored electric charges while the other part of the electric charges of the other polarity flows into the linear electrodes. The electric signal flowing into the linear electrodes are amplified by a reading amplifier connected to the linear electrodes, whereby an image signal is obtained and the radiation image is read out.

In the TFT system, the electric charges stored in the radiation image sensor is read out by selectively turning on and off tow-dimensionally arranged TFT switches.

The electric signal output from the radiation image sensor is digitized by an A/D converter and is obtained as the image signal.

The radiation image sensors described above are disclosed, for instance, in Japanese Unexamined Patent Publication No. 2002-224095.

However, when the electric signal is digitized by an A/D converter, the range of the magnitude of the charge signal stored in the radiation image sensor is sometimes narrower than the conversion range of the A/D converter. In this case, the bit resolution by the A/D converter deteriorates and especially in an electric signal corresponding to a small amount of radiation, quantizing noise is conspicuous since the magnitude of the signal is weak. Though such a problem can be avoided if an A/D converter of high resolution is employed, this approach adds to the cost.

SUMMARY OF THE INVENTION

In view of the foregoing observations and description, the primary object of the present invention is to provide a method of and apparatus for reading out a radiation image from a radiation image sensor which can improve the bit resolution without increasing the cost when digitizing the electric signal output from the radiation image sensor.

In accordance with an aspect of the present invention, there is provided a method of reading out a radiation image from a radiation image sensor, which stores electric charges corresponding to the amount of radiation exposed onto the radiation image sensor upon exposure of radiation carrying thereon a radiation image and thereby stores the radiation image, by causing the radiation image sensor to output an electric signal corresponding to the stored electric charges and by amplifying the output electric signal by a reading amplifier, wherein the improvement comprises that a part of the stored electric charges are read before reading the radiation image and, the gain of the reading amplifier is changed on the basis of the amount of electric charges of the part of the stored electric charges which has been read before reading the radiation image.

The gain of the reading amplifier may be changed on the basis of the amount of electric charges of the part of the stored electric charges which has been read before reading the radiation image so that the range of the electric signal obtained by reading the radiation image matches the conversion range of an A/D converter which digitizes the electric signal. An offset may be determined according to the amount of electric charges of the part of the stored electric charges which has been read before reading the radiation image and the offset determined may be added to the electric signal obtained by reading the radiation image.

The gain of the reading amplifier and an offset may be determined on the basis of the amount of electric charges of the part of the stored electric charges which has been read before reading the radiation image so that the electric signal obtained by reading the radiation image matches the conversion range of an A/D converter which digitizes the electric signal.

The gain of the reading amplifier when reading the part of the stored electric charges may be determined on the basis of the exposure condition when the radiation image is recorded.

Further, when erasing light is exposed onto the radiation image sensor to erase the residual image of the radiation image sensor after the image on the radiation image sensor is read out, the amount of the erasing light may be changed on the basis of the amount of electric charges of the part of the stored electric charges which has been read before reading the radiation image.

In accordance with another aspect of the present invention, there is provided an apparatus for reading out a radiation image comprising a radiation image sensor which stores electric charges corresponding to the amount of radiation exposed onto the radiation image sensor upon exposure of radiation carrying thereon a radiation image, thereby storing the radiation image and outputs an electric signal corresponding to the stored electric charges and a reading means which is provided with a reading amplifier which amplifies and outputs the electric signal output by the radiation image sensor and causes the radiation image sensor to output the electric signal corresponding to the stored electric charges and the reading amplifier to amplify and output the electric signal output from the radiation image sensor, wherein the improvement comprises that the reading amplifier is a variable gain amplifier, and the reading means reads a part of the stored electric charges before reading the radiation image and, changes the gain of the reading amplifier on the basis of the amount of electric charges of the part of the stored electric charges which has been read before reading the radiation image.

In the apparatus for reading out a radiation image, the reading means may change the gain of the reading amplifier on the basis of the amount of electric charges of the part of the stored electric charges which has been read before reading the radiation image so that the range of the electric signal obtained by reading the radiation image matches the conversion range of an A/D converter which digitizes the electric signal.

The apparatus may be provided with an offset adding means which determines an offset according to the amount of electric charges of the part of the stored electric charges which has been read before reading the radiation image and adds the offset determined to the electric signal obtained by reading the radiation image.

The reading means may change the gain of the reading amplifier on the basis of the amount of electric charges of the part of the stored electric charges which has been read before reading the radiation image so that the range of the electric signal obtained by reading the radiation image matches the conversion range of an A/D converter which digitizes the electric signal with the offset adding means determining the offset according to the amount of electric charges of the part of the stored electric charges which has been read before reading the radiation image so that the range of the electric signal obtained by reading the radiation image matches the conversion range of the A/D converter which digitizes the electric signal.

The reading means may determine the gain of the reading amplifier when reading the part of the stored electric charges on the basis of the exposure condition when the radiation image is recorded.

Further, the reading means may be provided with a residual image erasing means which exposes erasing light onto the radiation image sensor to erase the residual image of the radiation image sensor after the image on the radiation image sensor is readout, the residual image erasing means may change the amount of the erasing light on the basis of the amount of electric charges of the part of the stored electric charges which has been read before reading the radiation image.

The expression "to change the gain of the reading amplifier so that the range of the electric signal obtained by reading the radiation image matches the conversion range of an A/D converter which digitizes the electric signal" means to cause the range of the electric signal to correspond to the conversion range of the A/D converter so that a desired bit resolution can be obtained. For example, that the range of the electric signal substantially conforms to the whole conversion range of the A/D converter is sufficient.

To cause the range of the electric signal to match the conversion range of an A/D converter which digitizes the electric signal by changing only the gain of the reading amplifier out of the gain of the reading amplifier and an offset means to cause the range of the electric signal to match the conversion range of the A/D converter within the range adjustable by solely changing the reading amplifier.

Further, to cause the range of the electric signal to match the conversion range of an A/D converter which digitizes the electric signal by changing the gain of the reading amplifier and adding an offset means to cause the range of the electric signal to match the conversion range of the A/D converter within the range adjustable by changing the gain of the reading amplifier and adding the offset.

In accordance with the present invention, a part of the stored electric charges are read before reading the radiation image and, the gain of the reading amplifier is changed on the basis of the amount of electric charges of the part of the stored electric charges which has been read before reading the radiation image. Accordingly, the bit resolution upon digitization can be improved without increasing the cost, for instance, by changing the gain of the reading amplifier so that the range of the electric signal obtained by reading the radiation image matches the conversion range of an A/D converter which digitizes the electric signal.

Further, when an offset is determined according to the amount of electric charges of the part of the stored electric charges which has been read before reading the radiation image and the offset determined is added to the electric signal obtained by reading the radiation image, in addition to changing the gain of the reading amplifier so that the range of the electric signal obtained by reading the radiation image matches the conversion range of an A/D converter which digitizes the electric signal, the conversion range can be more adequately allotted and at the same time, the range of the electric signal can be easily matched with the conversion range of the A/D converter.

Further, when the gain of the reading amplifier when reading the part of the stored electric charges is determined on the basis of the exposure condition when the radiation image is recorded, the gain of the reading amplifier can be according to the magnitude of the energy of radiation exposed onto the radiation image sensor when reading the part of the stored electric charges. Accordingly that the electric signal obtained by reading the part of the stored electric charges is saturated by the reading amplifier can be avoided and at the same time, a signal of adequate strength can be obtained.

Further, when the amount of the erasing light exposed onto the radiation image sensor to erase the residual image of the radiation image sensor after the image on the radiation image sensor is read out is changed on the basis of the amount of electric charges of the part of the stored electric charges which has been read before reading the radiation image, the amount of the erasing light can be according to the magnitude of the energy of radiation exposed onto the radiation image sensor since the amount of electric charges of the part of the stored electric charges correspond to the magnitude of the energy of radiation exposed onto the radiation image sensor and the residual electric charges on the radiation image sensor can be adequately erased.

BRIEF DESCRIPTION OF THE DRAWINGS

FIG. 7 is a schematic view showing a radiation image recording/read-out apparatus employing a radiation image read-out apparatus in accordance with another embodiment of the present invention.

DESCRIPTION OF THE PREFERRED EMBODIMENTS

Figure 1:
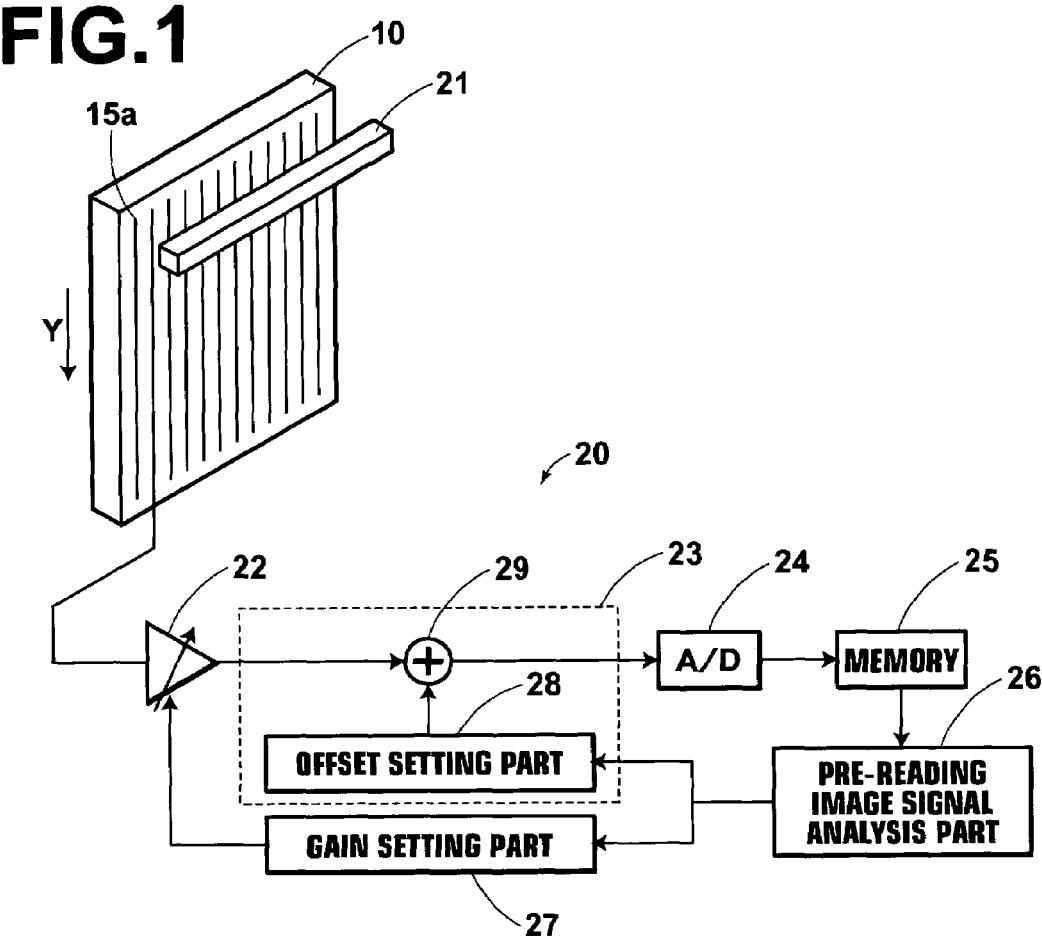
FIG. 1 is a schematic view showing a radiation image recording/read-out apparatus employing a radiation image read-out apparatus in accordance with an embodiment of the present invention.

A radiation image recording/read-out apparatus for carrying out a method of reading a radiation image from a radiation image sensor in accordance with an embodiment of the present invention will be described with reference to the drawings hereinbelow. FIG. 1 shows in brief the radiation image recording/read-out apparatus. The radiation image recording/read-out apparatus records a radiation image by the use of a radiation image sensor which stores electric charges corresponding to the amount of radiation exposed onto the radiation image sensor upon exposure of radiation carrying thereon a radiation image, thereby recording thereon the radiation image, and reads a part of the stored electric charges before reading the radiation image from the radiation image sensor on which the radiation image has been recorded, and suitably reads the radiation image on the basis of the read part of the electric charges. In the following description, reading the radiation image from the radiation image sensor will be referred to as the "final reading" and reading a part of the stored electric charges before the final reading will be referred to as the "pre-reading".

In FIG. 1, the radiation image recording/read-out apparatus in accordance with the embodiment of the present invention comprises a radiation image sensor 10 which records a radiation image by storing electric charges corresponding to the amount of radiation exposed thereonto upon exposure of radiation passing through an object and which outputs electric signals according to the amount of stored electric charges, a reading light source part 21 which causes a linear reading light beam to scan the radiation image sensor 10, and a reading means 20 which is provided with a reading amplifier 22 which amplifies the electric signal output from the radiation image sensor 10 and causes the reading amplifier 22 to amplify the electric signal output from the radiation image sensor 10 according to the amount of electric charges stored in the radiation image sensor 10 and to output it, thereby reading the radiation image.

Figure 2:
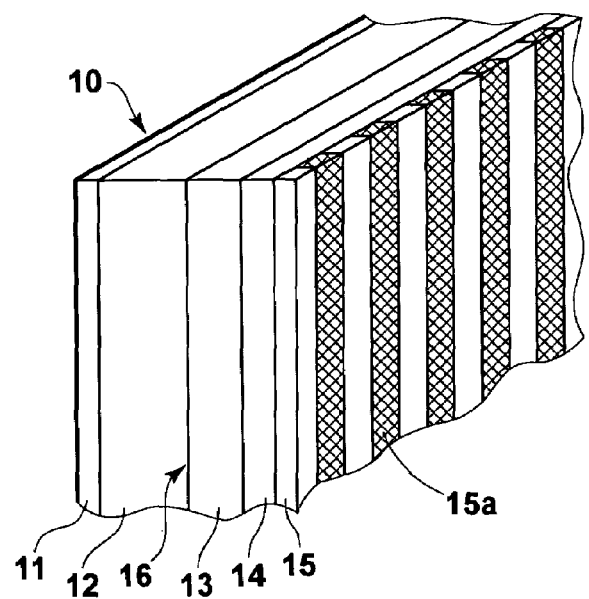
FIG. 2 is an enlarged fragmentary view showing the radiation image sensor employed in the radiation image recording/read-out apparatus.

As shown in FIG. 2, the radiation image sensor 10 comprises a first electrode layer 11 permeable to radiation passing through an object, a recording photoconductive layer 12 which generates electric charges upon exposure to radiation passing through the first electrode layer 11, a charge transfer layer 13 which behaves like a substantially insulating material to the electric charges generated in the recording photoconductive layer 12 and behaves like a substantially conductive material to the electric charge in the polarity opposite to that of the electric charges generated in the recording photoconductive layer 12, a reading photoconductive layer 14 which generates electric charges upon exposure to reading light, and a second electrode layer 15 in which a plurality of linear electrodes 15a permeable to the reading light are arranged in parallel to each other, the layers being superposed one on another in this order. A charge accumulating part 16 which accumulates electric charges generated according to the amount of the exposed radiation is formed at the interface between the recording photoconductive layer 12 and the charge transfer layer 13. The linear electrodes 15a in the second electrode layer 15 are arranged at the same pitches as the pixels forming the radiation image.

Figure 3:
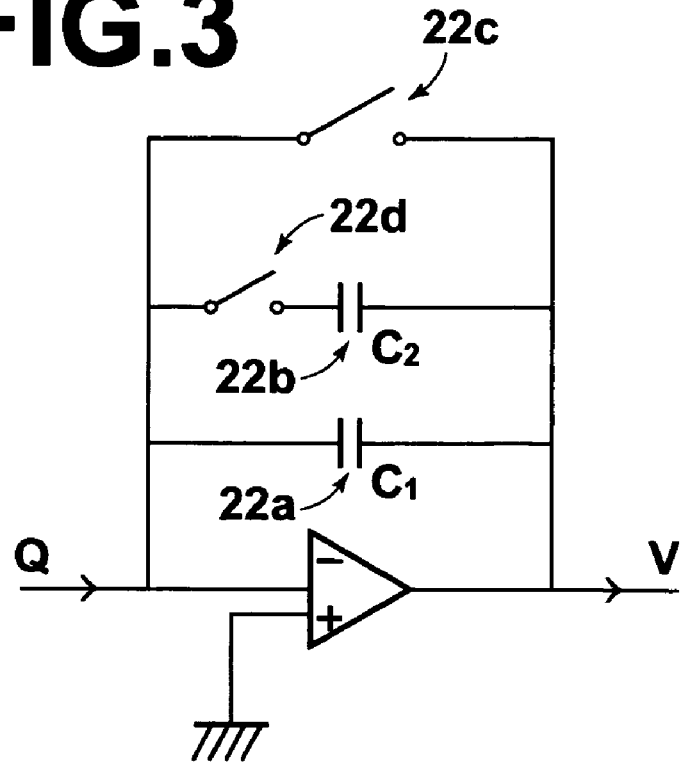
FIG. 3 is a view for illustrating an example of the circuit of the reading amplifier in the radiation image recording/read-out apparatus.
Figure 4:
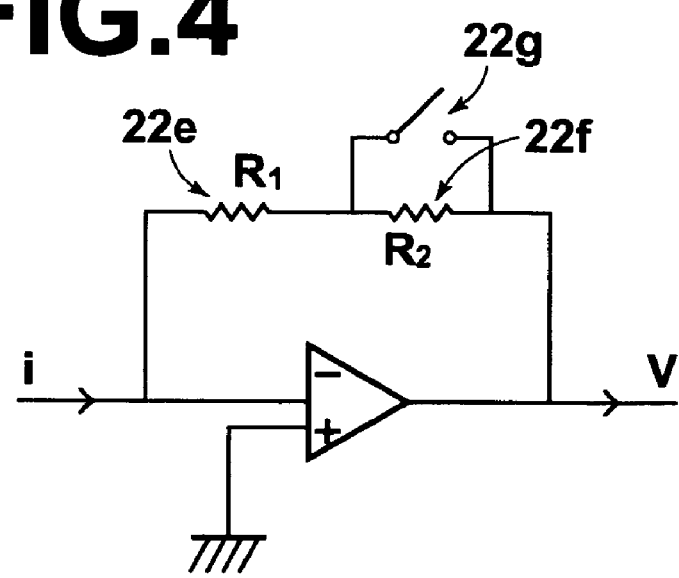
FIG. 4 is a view for illustrating another example of the circuit of the reading amplifier in the radiation image recording/read-out apparatus.

The reading amplifier 22 in the reading means 20 is a charge amplifier and is connected to each of the linear electrodes 15a of the radiation image sensor 10. The reading amplifier 22 is a gain variable amplifier. For example, the reading amplifier 22 is of a structure shown in FIG. 3, and comprises a capacitor 22a which stores electric signals flowing out through the linear electrodes 15a of the radiation image sensor 10, a capacitor 22b, a reset switch 22c and a gain switching switch 22d. The gain switching switch 22d is turned ON and OFF by a control signal from a gain setting part 27 to be described later, and the gain of the reading amplifier 22 changes depending on whether the gain switching switch 22d is ON or OFF. Assuming that the capacity of the capacitor 22a is C1 and the capacity of the capacitor 22b is C2, the voltage V output from the reading amplifier 22 is Q/(C1+C2) when the gain switching switch 22d is ON, and is Q/C1 when the gain switching switch 22d is OFF. Though a reading amplifier 22 having a pair of capacitors have been described above for the purpose of simplicity of description, actually it is preferred that a reading amplifier 22 be provided with a number of capacitors and the like number of gain switching switches so that by selectively turning ON and OFF the gain switching switches, the gain of the reading amplifier 22 can be changed in a number of stages. Though being a charge amplifier in this embodiment as described above, the reading amplifier 22 need not be limited to the charge amplifier but may be an I-V amplifier. For example, the reading amplifier 22 may be an I-V amplifier comprising a resistor 22e, a resistor 22f and a gain switching switch 22g as shown in FIG. 4. The gain switching switch 22g in the I-V amplifier is also turned ON and OFF by a control signal from a gain setting part 27 to be described later, and the gain of the reading amplifier 22 changes depending on whether the gain switching switch 22g is ON or OFF as in the charge amplifier described above. Assuming that the resistance of the resistor 22e is R1 and the resistance of the resistor 22f is R2, the voltage V output from the reading amplifier 22 is −i×R1 when the gain switching switch 22g is ON, and is −i×(R1+R2) when the gain switching switch 22g is OFF. Though being arranged as described above in this embodiment, the reading amplifier 22 may of any structure so long as the gain thereof is variable.

The reading means 20, as shown in FIG. 1, is provided with an offset adding means 23 which adds a predetermined offset to the electric signal output from the reading amplifier 22, has been output from the reading amplifier 22 and has been added an A/D converter 24 which digitizes the electric signal which with the offset by the offset adding means 23, a memory 25 which stores the digital electric signal output from the A/D converter 24, a pre-reading image signal analysis part 26 which generates a histogram of a pre-read image signal (to be described later) stored in the memory 25, and the gain setting part 27 which sets the gain of the reading amplifier 22 upon final reading on the basis of the histogram generated by the pre-reading image signal analysis part 26.

The offset adding means 23 comprises an offset setting part 28 which sets offset to be added to the electric signal read upon the final reading on the basis of the histogram generated by the pre-reading image signal analysis part 26, and the adding part 29 which adds the offset set by the offset setting part 28 to the electric signal amplified by the reading amplifier 22.

The reading light source part 21 of the reading means 20 causes a linear reading light beam to scan the radiation image sensor 10 and comprises a linear light source which emits a linear reading light beam and a conveyor mechanism which conveys the linear light source in the longitudinal direction of the linear electrodes 15a. The conveyor mechanism is abbreviated.

Operation of this radiation image recording/read-out apparatus will be described, hereinbelow. Recording of a radiation image on the radiation image sensor 10 will be first described.

With the radiation image sensor 10 imparted with an electric voltage so that the first electrode layer 11 is negatively charged and the second electrode layer 15 is positively charged, radiation passing through an object is exposed from the side of the first electrode layer 11 of the radiation image sensor 10. The radiation passing through the first electrode layer 11 impinges upon the recording photoconductive layer 12, whereby charged pairs are generated in the recording photoconductive layer 12. The positive charges of the charged pairs are combined with the negative charges on the first electrode layer 11 and cancelled, whereas the negative charges of the charged pairs are stored on the charge accumulating part 16 formed on the interface between the recording photoconductive layer 12 and the charge transfer layer 12 as latent image charges, whereby a radiation image is recorded on the radiation image sensor 10.

Operation of the pre-reading which is carried out before the final reading for obtaining the image signal making up the radiation image will be described, hereinbelow.

With the first electrode layer 11 grounded, a linear reading light beam is exposed onto the radiation image sensor 10 from the reading light source part 21. The reading light beam thus exposed onto the radiation image sensor 10 passes through the linear electrodes 15a and impinges upon the reading photoconductive layer 14.

The positive charges generated in the reading photoconductive layer 14 upon exposure to the reading light beam are combined with the latent image charges on the charge accumulating part 16, while the negative charges are combined with the positive charges on the linear electrode 15a of the second electrode layer 15 and the electric signal according to the amount of the combined charges flows out to the linear electrodes 15a and is input into the reading amplifier 22. The reading amplifier 22 integrates the input electric signal and outputs the integrated electric signal after amplifying it at a predetermined gain. In this embodiment, it is assumed that all the gain switching switches 22d are ON during the pre-reading so that the gain of the reading amplifier 22 is minimized. Then the electric signal output from the reading amplifier 22 is input into the A/D converter 24 through the offset adding means 23. The offset adding means 23 adds no offset to the electric signal output from the reading amplifier 22 during the pre-reading.

The electric signal input into the A/D converter 24 is digitized by the A/D converter 24 and the digitized electric signal is stored in the memory 25. The electric signal flowing out to each of the linear electrodes 15a upon a line of the reading light beam is obtained as the pre-reading image signal for one pixel and by scanning the entire area of the radiation image sensor 10 with the linear reading light beam, the pre-reading image signal for each of the pixels of the overall radiation image sensor 10 is stored in the memory 25. The amount of light of the reading light beam to be exposed from the reading light source part 21 onto the radiation image sensor 10 upon the pre-reading is smaller than that to be exposed onto the radiation image sensor 10 upon the final reading. The amount of light may be adjusted either by changing the intensity of the reading light or changing the scanning aped.

Figure 5:
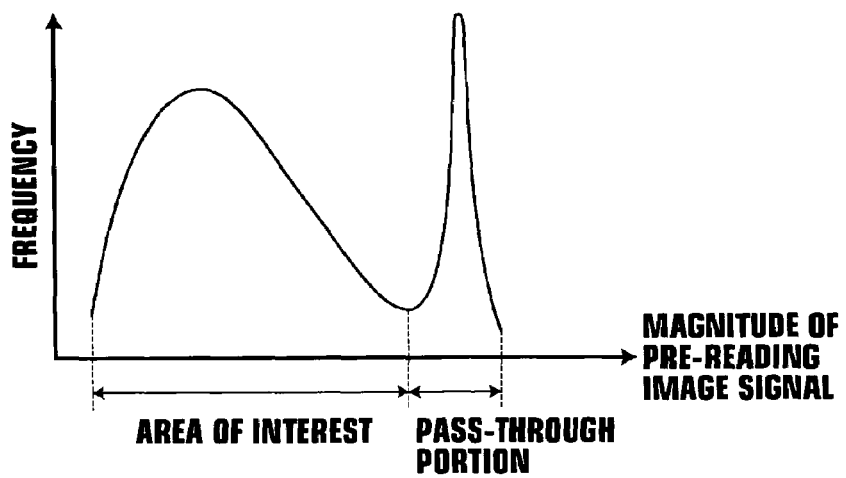
FIG. 5 is a view showing an example of the histogram generated in the pre-reading image signal analysis part of the radiation image recording/read-out apparatus.

The pre-reading image signal thus stored in the memory 25 is output to the pre-reading image signal analysis part 26, and a histogram of the pre-reading image signals is generated by the pre-reading image signal analysis part 26. The pre-reading image signal analysis part 26 generates a histogram such as shown in FIG. 5. The pre-reading image signal corresponding to the pass-through portion in the histogram shown in FIG. 5 is a signal corresponding to the radiation which does not pass through the object and impinges upon the radiation image sensor 10, and the pre-reading image signal corresponding to the area of interest in the histogram shown in FIG. 5 is a signal corresponding to the radiation which passes through the object and impinges upon the radiation image sensor 10. Accordingly, in the pre-reading image signal analysis part 26 in this embodiment, the range of the electric signal output from the radiation image sensor 10 during the final reading is calculated on the basis of the magnitude of the pre-reading image signal output from the area of interest and the amount of reading light during the pre-reading, and the gain and the offset are respectively set in the gain setting part 27 and the offset setting part 28 so that the range of the electric signal matches the conversion range of the A/D converter 24.

Figure 6A:
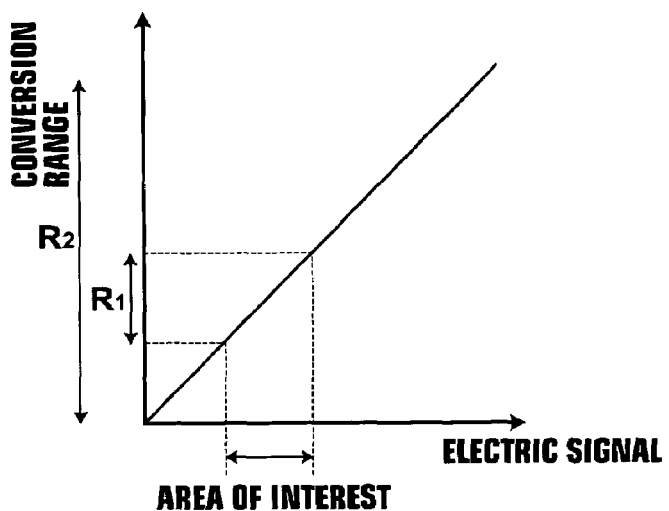
FIGS. 6A and 6B are views for illustrating setting of the gain of the reading amplifier and the offset in the radiation image recording/read-out apparatus.
Figure 6B:
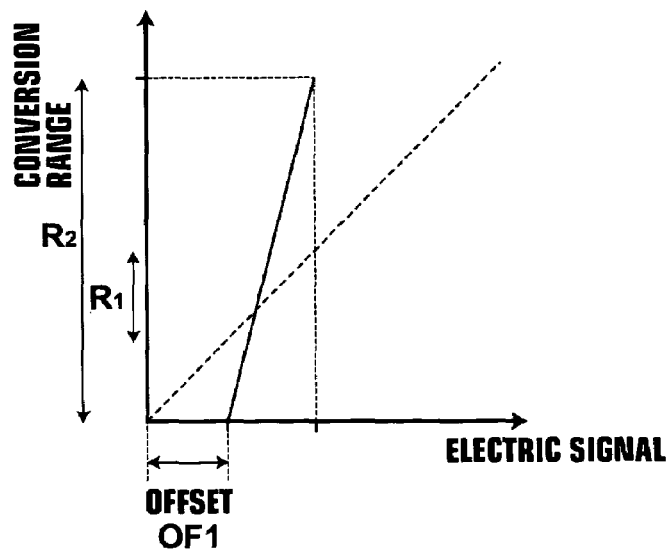

For example, when the range of the electric signal is as indicated at the "area of interest" in FIG. 6A and the conversion range of the A/D converter 24 corresponding to the range is range R1 which is a part of the entire conversion range R2 of the A/D converter 24, the gain setting part 27 and the offset setting part 28 calculate the gain and the offset OF1 so that the maximum value and the minimum value of the electric signal in the area of interest are equalized to those in the conversion range R2 of the A/D converter 24, and the gain setting part 27 outputs the control signal for selectively turning ON and OFF the gain switching switch while the offset setting part 28 sets so that OF1 is added to the electric signal upon the final reading.

The final reading which is carried out after the pre-reading described above will be described, hereinbelow. During the final reading, a linear reading light beam is exposed onto the radiation image sensor 10 line by line in an amount larger than during the pre-reading with the first electrode layer 11 grounded as during the pre-reading. The electric signal flows out from the linear electrodes 15a in the same manner as in the pre-reading and the electric signal is amplified by the reading amplifier 22 and is output. At this time, the reading amplifier 22 has a gain set by the gain setting part 27 as described above. The electric signal amplified by the reading amplifier 22 is output to the offset adding means 23 and in the adding part 29, added with offset OF1 calculated in the above manner. The electric signal added with the offset OF1 is output to the A/D converter 24 to be digitized and the digitized electric signal is stored in the memory 25 as an image signal forming the radiation image.

With the radiation image recording/read-out apparatus of the embodiment described above, a part of the electric charges stored in the radiation image sensor 10 are read before reading the radiation image and, the gain of the reading amplifier is changed on the basis of the amount of electric charges of the part of the stored electric charges which has been read before reading the radiation image. Accordingly, the bit resolution upon digitization can be improved without increasing the cost, for instance, by changing the gain of the reading amplifier 22 so that the range of the electric signal obtained by reading the radiation image matches the conversion range of an A/D converter which digitizes the electric signal.

Further, the radiation image recording/read-out apparatus of the embodiment described above may further comprises an erasing light setting part 30 and a residual image erasing means 31 as shown in FIG. 7. The residual image erasing means 31 is a means for removing the residual image by causing the radiation image sensor 10 to discharge the residual electric charges after the final reading of the radiation image, and may comprise, for instance, an erasing light source which exposes erasing light over the entire area of the radiation image sensor 10. The erasing light setting part 30 sets the amount of erasing light to be emitted from the residual image erasing means 31. The erasing light setting part 30 sets the amount of erasing light on the basis of the histogram generated by the pre-reading image signal analysis part 26, and, for instance, may set the amount of erasing light to such an amount that can wholly discharge the electric charges on the radiation image sensor 10 by calculating the amount of electric charges stored on the radiation image sensor 10 on the basis of the maximum value of the pre-reading image signal and the amount of light during the pre-reading. The amount of erasing light may be adjusted by changing the intensity of the erasing light or by changing the exposing time of the same.

Though, in the radiation image recording/read-out apparatus of the embodiment described above, the gain of the reading amplifier 22 is minimized during the pre-reading, the gain of the reading amplifier 22 during the pre-reading need not be limited to the minimum value but may be any value so long as the electric signal which is read out and amplified during the pre-reading is not saturated and of a sufficient magnitude. For example, the gain of the reading amplifier 22 during the pre-reading may be determined on the basis of the image-exposure conditions. The image-exposure conditions may include, for instance, the part to be taken, the intensity and the quality of the radiation during taking the image, the radiation irradiating time, and the method of taking the image. However, anything may be utilized so long as it represents the amount of electric charges stored on the radiation image sensor 10.

Though, in the radiation image recording/read-out apparatus of the embodiment described above, the reading light source part is provided with a linear light source emitting a linear reading light beam, the reading light source part may be provided with a surface light source where a number of linear light source electrodes extending in a direction perpendicular to the longitudinal direction of the linear electrodes 15a of the radiation image sensor 10 are arranged in the longitudinal direction of the linear electrodes 15a. The surface light source emits a linear reading light beam by applying an electric voltage to an EL light emitting body provided between the linear light source electrodes and a planar electrode opposed to the surface on which the linear light source electrodes are arranged, for each of the linear light source electrodes and may use an organic EL element light source or an inorganic EL element light source.

Further, though, in the radiation image recording/read-out apparatus of the embodiment described above, a radiation image sensor of so-called an optical readout system is used, the radiation image sensor need not be limited to those of the type and may be of a TFT readout system. When a radiation image sensor of a TFT readout system is employed, it is preferred that the ON time of the TFT switch during the pre-reading be shorter than the ON time of the TFT switch during the final reading.

What is claimed is:

1. A method of reading out a radiation image from a radiation image sensor, which stores electric charges corresponding to the amount of radiation exposed onto the radiation image sensor upon exposure of radiation carrying thereon a radiation image and thereby stores the radiation image, by causing the radiation image sensor to output an electric signal corresponding to the stored electric charges and by amplifying the output electric signal by a reading amplifier, wherein the improvement comprises that a part of the stored electric charges are read before reading the radiation image, and an offset is determined according to an amount of electric charges of the part of the stored electric charges which has been read before reading the radiation image and the determined offset is added to the electric signal obtained by reading the radiation image.

2. A method as defined in claim 1 in which the gain of the reading amplifier is changed on the basis of the amount of electric charges of the part of the stored electric charges which has been read before reading the radiation image so that the range of the electric signal obtained by reading the radiation image matches the conversion range of an A/D converter which digitizes the electric signal.

3. A method as defined in claim 2 in which the gain of the reading amplifier and the offset are determined on the basis of the amount of electric charges of the part of the stored electric charges which has been read before reading the radiation image so that the range of the electric signal obtained by reading the radiation image matches the conversion range of an A/D converter which digitizes the electric signal.

4. A method as defined in claim 1 in which the gain of the reading amplifier when reading the part of the stored electric charges is determined on the basis of the exposure condition when the radiation image is recorded.

5. A method as defined in claim 1 in which when erasing light is exposed onto the radiation image sensor to erase the residual image of the radiation image sensor after the image on the radiation image sensor is read out, the amount of the erasing light is changed on the basis of the amount of electric charges of the part of the stored electric charges which has been read before reading the radiation image.

6. An apparatus for reading out a radiation image comprising:

a radiation image sensor which stores electric charges corresponding to the amount of radiation exposed onto the radiation image sensor upon exposure of radiation carrying thereon a radiation image, thereby storing the radiation image and outputs an electric signal corresponding to the stored electric charges and a reading means which is provided with a reading amplifier which amplifies and outputs the electric signal output by the radiation image sensor and causes the radiation image sensor to output the electric signal corresponding to the stored electric charges and the reading amplifier to amplify and output the electric signal output from the radiation image sensor, wherein the improvement comprises that the reading amplifier is a variable gain amplifier, and the reading means reads a part of the stored electric charges before reading the radiation image, wherein the apparatus further comprises:

an offset adding means which determines an offset according to an amount of electric charges of the part of the stored electric charges which has been read before reading the radiation image and adds the determined offset to the electric signal obtained by reading the radiation image.

7. An apparatus as defined in claim 6 in which the reading means changes the gain of the reading amplifier on the basis of the amount of electric charges of the part of the stored electric charges which has been read before reading the radiation image so that the range of the electric signal obtained by reading the radiation image matches the conversion range of an A/D converter which digitizes the electric signal.

8. An apparatus as defined in claim 7 in which the reading means changes the gain of the reading amplifier on the basis of the amount of electric charges of the part of the stored electric charges which has been read before reading the radiation image so that the range of the electric signal obtained by reading the radiation image matches the conversion range of an A/D converter which digitizes the electric signal and the offset adding means changes the offset on the basis of the amount of electric charges of the part of the stored electric charges which has been read before reading the radiation image so that the range of the electric signal obtained by reading the radiation image matches the conversion range of the A/D converter which digitizes the electric signal.

9. An apparatus as defined in claim 6 in which the reading means determines the gain of the reading amplifier when reading the part of the stored electric charges on the basis of the exposure condition when the radiation image is recorded.

10. An apparatus as defined in claim 6 further comprising a residual image erasing means which exposes erasing light onto the radiation image sensor to erase the residual image of the radiation image sensor after the image on the radiation image sensor is read out, the residual image erasing means changing the amount of the erasing light on the basis of the amount of electric charges of the part of the stored electric charges which has been read before reading the radiation image.

11. A method as defined in claim 1, wherein a gain of the reading amplifier is changed on the basis of the amount of electric charges of the part of the stored electric charges which has been read before reading the radiation image.

12. An apparatus as defined in claim 6, wherein the reading means changes a gain of the reading amplifier on the basis of the amount of electric charges of the part of the stored electric charges which has been read before reading the radiation image.

* * * * *